Nov. 15, 1955  P. L. BARNETT  2,723,882
SPRAYING APPARATUS FOR CORROSIVE MATERIALS
Filed Feb. 11, 1954
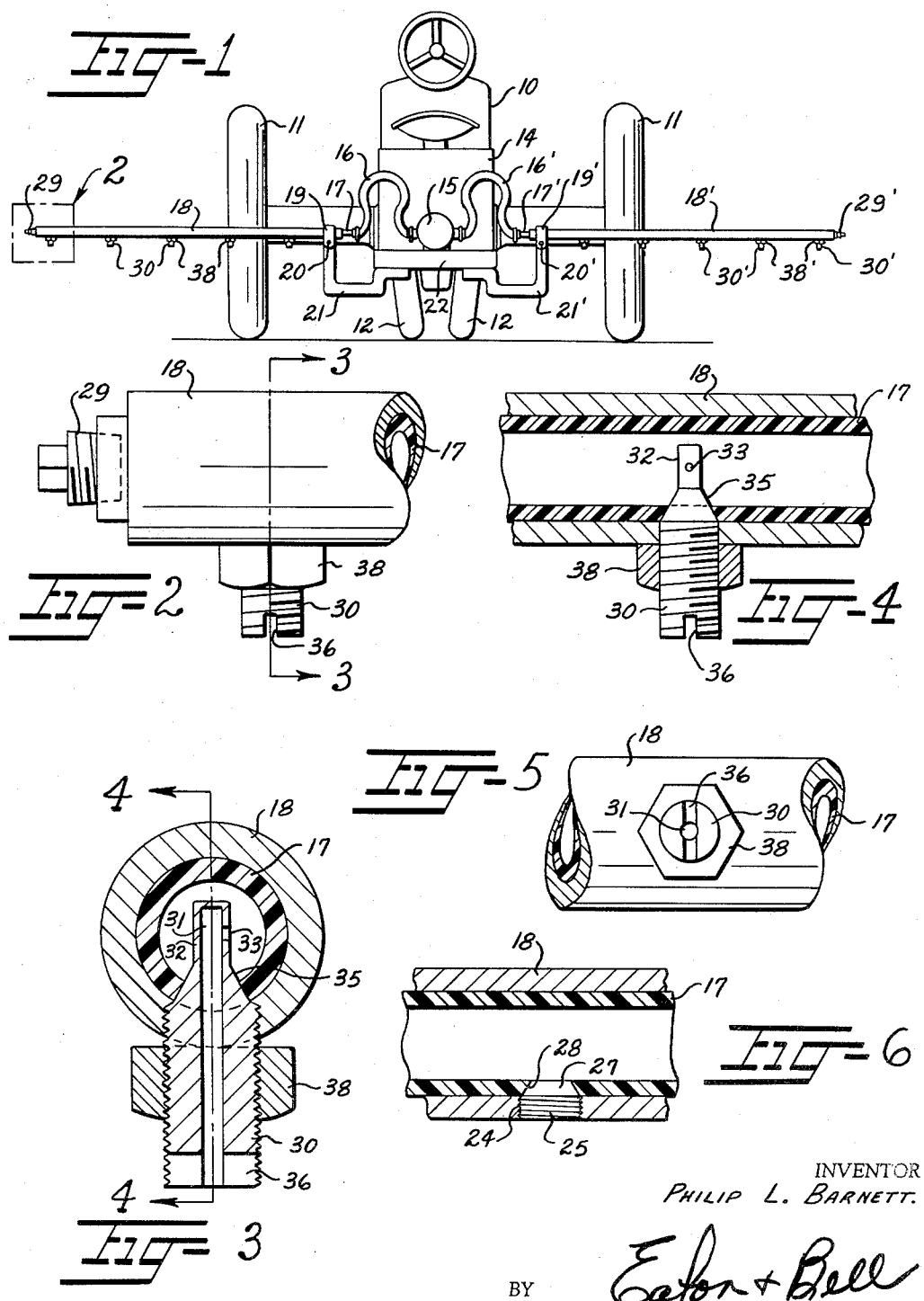
INVENTOR:
PHILIP L. BARNETT.
BY Eaton + Bell
ATTORNEYS.

2,723,882
SPRAYING APPARATUS FOR CORROSIVE MATERIALS

Philip L. Barnett, Greensboro, N. C.

Application February 11, 1954, Serial No. 409,645

3 Claims. (Cl. 299—106)

This invention relates to spraying apparatus and more especially to spraying apparatus for agricultural purposes such as the distribution of liquid fertilizers such as nitrogenous liquid fertilizers and in the dispensing or spraying of any type of liquid agent which has a tendency to corrode ordinary metallic pipe made from iron, copper, bronze and the like.

It is an object of this invention to provide a plastic pipe for conducting the liquid and having spray nozzles associated therewith and attaching the same to a suitable conveyance having pumping mechanism and a tank for forcing the liquid through the plastic pipe and the nozzles. By having an elevated tank, the pump may be eliminated. The fact is a plastic pipe is not of sufficient strength usually to maintain itself and must be supported in some manner and also it is not strong enough to securely hold a nozzle screwed into a hole in the plastic pipe so it is an object of this invention to provide a steel or metallic pipe into which the plastic pipe is inserted and then provide suitable threaded bores in the metallic pipe for the insertion of the spray nozzles and having a coinciding bore in the plastic pipe through which the nozzle will project to the interior of the plastic pipe and the plastic pipe bores being such as to form a liquid tight seal with the spray nozzle when the spray nozzle is screwed through a coinciding opening in the metallic pipe.

Therefore, the metallic pipe not only supports the plastic pipe against bending or breakage but it also supports the spray nozzles in such a manner as to form a liquid tight seal in the openings in the plastic pipe through which the spray nozzles project.

Some of the objects of the invention having been stated, other objects will appear as the description proceeds, when taken in connection with the accompanying drawings, in which—

Figure 1 is a rear elevation of a suitable tractor showing the mechanism attached thereto;

Figure 2 is an enlarged elevation of the left-hand portion of Figure 1 and showing that portion which is enclosed within the dotted area No. 2 in said figure;

Figure 3 is a vertical sectional view taken along the line 3—3 in Figure 2;

Figure 4 is a longitudinal sectional view taken along line 4—4 in Figure 3;

Figure 5 is an elevation looking at a section of pipe having a spray nozzle therein and is preferably looking upward in Figure 4;

Figure 6 is a longitudinal view similar to Figure 4, but omitting the spray nozzle and associated parts.

Referring more specifically to the drawings the numeral 10 indicates a suitable tractor having rear wheels 11 and front wheels 12 and although this invention is shown attached to a tractor it could be attached to any wheeled conveyance. On the rear of the tractor is mounted a suitable tank 14 containing the liquid fertilizer and a pump 15 communicates with the tank and is driven by any suitable means such as being connected to the power take-off of the tractor. Extending from one side of this pump is a flexible connection 16 which is connected to a plastic pipe 17 disposed within a metallic pipe 18 and a cuff 19 surrounds the metallic pipe 18 and is pivoted as at 20 on a support 21 which is secured to a platform 22 secured to the tractor and which supports the tank 14. The right-hand side of the tractor has identical structure and will be indicated by the same reference characters as the left-hand side with the prime notation added.

The metallic pipe 18 as above stated has fitting therein a plastic pipe 17 and before the pipes 17 and 18 are assembled, the pipe 18 has a plurality of bores 24 therein which are threaded as at 25 and when all of these bores 24 have been formed and threaded the plastic pipe 17 is snugly fitted into the metallic pipe 18 and then suitable bores 27 are formed in the plastic pipe which has a tapering shoulder 28.

The remote ends of the plastic pipes 17 and 17' are interiorly threaded and have a suitable plug 29 screwed thereinto to close the remote ends of the pipes to prevent escape of the liquid from the pipes which is under pressure of the pump 15.

After the pipes 17 and 18 have been assembled and the bores 24 and 27 have been formed, into each of these bores is threaded a spray nozzle 30 which spray nozzle has a passageway 31 therein which in the restricted portion 32 of the spray nozzle has an opening 33 therein which communicates with the bore 31.

It is noted that each spray nozzle has a tapered shoulder 35 and the rest of the spray nozzle is threaded throughout its length and has a slot 36 in its outer end so that by means of a screwdriver the spray nozzle can be driven home in the threaded bore 24 so as to cause the tapered or shoulder portion 35 to tightly fit within the straight or tapered bore 27 so that the tapered portion 35 and the walls 28 will form a tight seal to prevent escape of the liquid from the plastic pipe 17. When thus adjusted each spray nozzle has a lock nut 38 threaded thereon to lock the spray nozzles in position and to prevent their becoming loosened by use.

Any suitable plastic material may be used in making the pipe 17 such as rubber, neoprene, polyethylene, vinyl resins or polyesters. Also, asbestos piping may be used as the inner pipe.

In the drawings and specification there has been set forth a preferred embodiment of the invention and, although specific terms are employed, they are used in a generic and descriptive sense only and not for purposes of limitation, the scope of the invention being defined in the claims.

I claim:

1. Apparatus for spraying liquid fertilizer comprising a metallic pipe and a plastic pipe fitting snugly within the metallic pipe, the metallic pipe having a plurality of bores whose axes are disposed at ninety degrees from the longitudinal axis of the pipes and the plastic pipe having a plurality of tapered bores therein coinciding with bores in the metallic pipe, a spray nozzle having a tapered shouldered portion and a threaded portion, the threaded portion being threadable into the threaded bores in the metallic pipe and the tapered portion fitting snugly in the tapered bore of the plastic pipe to form a liquid tight seal between the spray nozzle and the walls of the plastic pipe, said spray nozzle having a longitudinal bore extending substantially the length thereof but being closed at the end disposed within the plastic pipe and a lateral bore in the spray nozzle disposed within that portion of the spray nozzle which is disposed within the plastic pipe and extending at substantially ninety degrees to the longitudinal bore in the spray nozzle and a lock nut for locking the spray nozzle in adjusted position within the threaded bore in the metallic pipe, the free end of the plastic pipe being closed by suitable means and the open end of the plastic pipe having a source of fluid under pressure connected thereto.

2. Apparatus for spraying liquid fertilizer comprising a metallic pipe and a plastic pipe fitting snugly within the metallic pipe, the metallic pipe having a plurality of threaded bores whose axes are disposed ninety degrees from the longitudinal axis of the pipe and the plastic pipe having a plurality of tapered bores therein coinciding with bores in the metallic pipe, a spray nozzle having a tapered shouldered portion and a threaded portion, the threaded portion being threadable into the threaded bores in the metallic pipe and the tapered portion fitting snugly in the bore of the plastic pipe to form a liquid tight seal between the spray nozzle and the walls of the plastic pipe, and a lock nut for locking the spray nozzle in adjusted position within the threaded bore in the metallic pipe.

3. Apparatus for spraying liquid fertilizer comprising a metallic pipe and a plastic pipe fitting snugly within the metallic pipe, the metallic pipe having a plurality of threaded bores therein and the plastic pipe having a plurality of tapered bores therein coinciding with bores in the metallic pipe, a spray nozzle mounted in each bore and each having a tapered shouldered portion and a threaded portion, the threaded portion being threadable into the threaded bores in the metallic pipe and the tapered portion fitting snugly in the bore of the plastic pipe to form a liquid tight seal between the spray nozzle and the walls of the plastic pipe, and a lock nut for locking the spray nozzle in adjusted position within the threaded bore in the metallic pipe.

References Cited in the file of this patent

UNITED STATES PATENTS

| | | |
|---|---|---|
| 1,084,359 | Potter | Jan. 13, 1914 |
| 2,608,501 | Kimble | Aug. 26, 1952 |
| 2,664,373 | Reilly | Dec. 29, 1953 |